United States Patent [19]

Lenz et al.

[11] Patent Number: 5,236,764

[45] Date of Patent: Aug. 17, 1993

[54] COMPONENT FOR ABSORBING IMPACT ENERGY

[75] Inventors: Werner Lenz, Ludwigshafen; Friedrich Domas, Altlussheim; Udo Haardt, Biblis, all of Fed. Rep. of Germany

[73] Assignee: BASF Aktiengesellschaft, Ludwigshafen, Fed. Rep. of Germany

[21] Appl. No.: 665,870

[22] Filed: Mar. 7, 1991

[30] Foreign Application Priority Data

Mar. 12, 1990 [DE] Fed. Rep. of Germany ... 9002988[U]

[51] Int. Cl.⁵ .................... B32B 3/12; B60G 11/22
[52] U.S. Cl. ........................ 428/158; 428/83; 428/122; 428/156; 428/157; 428/159; 428/160; 428/192; 428/212; 428/213; 428/304.4; 428/167; 206/814; 267/292
[58] Field of Search ............. 428/156, 157, 158, 160, 428/220, 212, 304.4, 122, 192, 81, 83, 167, 159, 213; 206/814; 493/967; 267/153, 195, 292, 139

[56] References Cited

U.S. PATENT DOCUMENTS 3,016,317  1/1962  Brunner ..................... 428/167
4,169,179  9/1979  Bussey ...................... 428/167
4,355,792  10/1982 Fukuda et al. ............ 267/153
4,835,034  5/1989  Cruz ........................ 428/167

FOREIGN PATENT DOCUMENTS 1238278  4/1967  Fed. Rep. of Germany .
2853244  6/1980  Fed. Rep. of Germany .
2853255  6/1980  Fed. Rep. of Germany .
8630181  2/1987  Fed. Rep. of Germany .
3700854  7/1987  Fed. Rep. of Germany .
3626150  2/1988  Fed. Rep. of Germany .
2441683  6/1980  France .
1268451  11/1986 U.S.S.R. .
1449675  9/1976  United Kingdom .
2088524  6/1982  United Kingdom .

*Primary Examiner*—Donald J. Loney
*Attorney, Agent, or Firm*—Keil & Weinkauf

[57] ABSTRACT

A component having a virtually rectangular force-displacement characteristic line and comprising an elongated polymer foam block (1) of rectangular cross-section having sides a and b and having a recess (2) of width d and depth c extending along the entire length of the block on one side, said dimensions satisfying certain equations.

1 Claim, 2 Drawing Sheets

COMPONENT FOR ABSORBING IMPACT ENERGY

FIELD OF THE INVENTION

The present invention relates to a polymer foam component for absorbing impact energy, comprising an elongated polymer foam block of rectangular cross-section having sides a and b and having a recess which extends along the entire length of the block on one side.

SUMMARY OF THE INVENTION

The effectiveness of an impact energy-absorbing component is characterized by a quality factor $\eta$, which is from 0.5 to 0.7 in the polymer foam components conventional hitherto. It is calculated in accordance with the equation $$\eta = \frac{E_1}{E_2}$$

where $E_1$ is the energy actually absorbed, and $E_2$ is the energy which could be absorbed by an ideal energy absorber having the quality factor $\eta = 1$. As the diagram in FIG. 1 shows, a component of this type would have a quasi-rectangular force-displacement characteristic line, so that only a very small deformation s would occur at the maximum impact force $F_{max}$.

It is therefore an object of the present invention to develop a simple impact energy-absorbing component whose force-displacement characteristic line is essentially approximately rectangular.

We have found that this object is achieved by a component of the type outlined at the outset, in which, according to the invention, the recess having a depth c has a central part of width d with parallel sides, and a terminal circular arc part, and said dimensions satisfy the following equations:

$$a = 0.90 \ldots 1.10 \cdot b$$

$$c = 0.65 \ldots 0.80 \cdot b$$

$$D = 0.45 \ldots 0.55 \cdot a$$

BRIEF DESCRIPTION OF THE DRAWINGS

The invention is described in greater detail below with reference to an illustrative embodiment shown diagrammatically in the drawing, in which.

Figure 1:
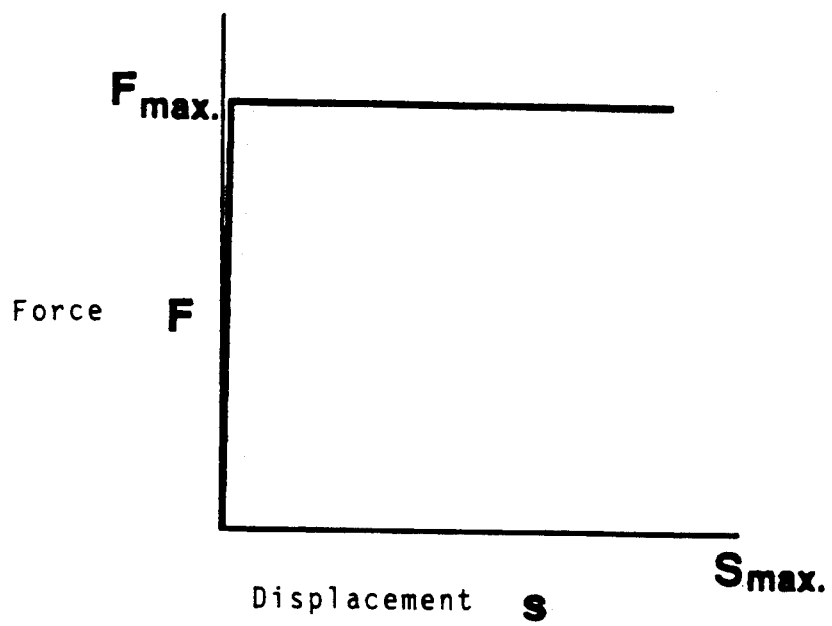
FIG. 1 shows a force-displacement diagram of an ideal energy-absorber component.
Figure 2:
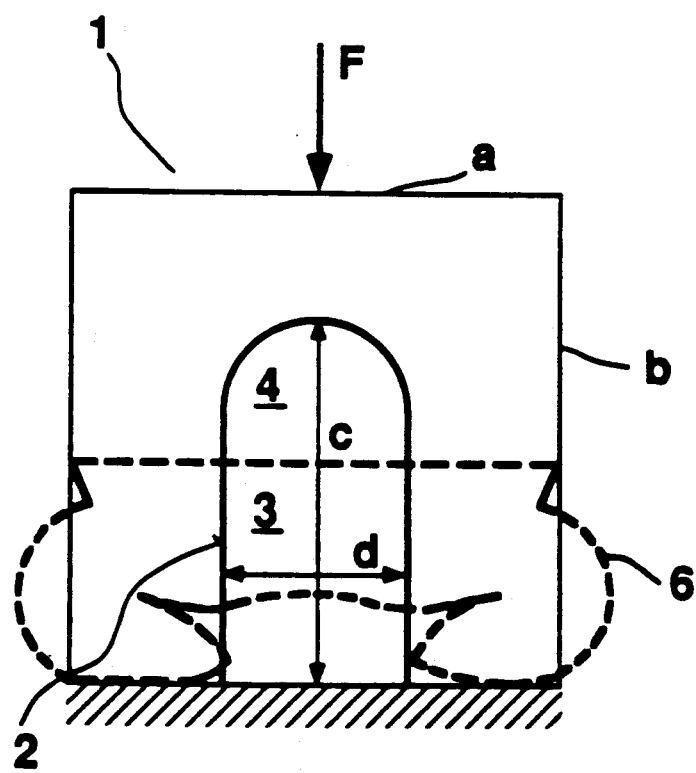
FIG. 2 shows a cross-section through a component having the features according to the invention.
Figure 3:
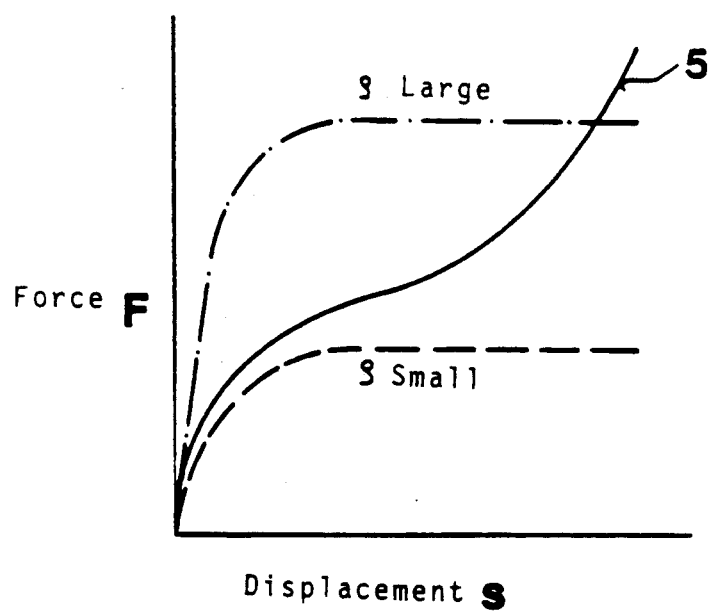
FIG. 3 shows a force-displacement diagram for a component represented in FIG. 2.

The component comprises an elongated polymer foam block 1 of rectangular cross-section having sides a and b and having a recess 2 which extends along the entire length of the block (FIG. 2). The impact force F to be absorbed acts on side a, which is on the opposite side to the recess 2. The recess has a central part 3 of width d which is parallel to side b, which adjoins a circular arc part 4. The overall depth of the recess is c. If the above dimensions satisfy the equations $$a = 0.90 \ldots 1.10 \cdot b$$

$$c = 0.65 \ldots 0.80 \cdot b$$

$$d = 0.45 \ldots 0.55 \cdot a,$$

the force-displacement characteristic lines represented in FIG. 3, which are virtually rectangular, are obtained, the curve parameter being the density $\rho$ of the component material. For comparison, a characteristic line 5 of conventional polymer foam components is shown.

The dashed contour 6 shown in FIG. 2 indicates the deformation of the foam block 1 at maximum impact force $F_{max}$. When the impact force abates, the block returns to its original shape virtually elastically.

DESCRIPTION OF THE PREFERRED EMBODIMENTS

Suitable foam materials are hard and semi-hard foam systems, such as expanded polypropylene, polyurethane and polyvinyl chloride.

Experiments using components of the invention made from such materials have shown that the quality factor $\eta$ is considerably increased over conventional components.

We claim:

1. A polymer foam component for absorbing impact energy, comprising an elongated polymer foam block having:
   a length;
   a width "a"; and
   a height "b";
such block also having a recess which extends the entire length of the block, such recess characterized by:
   a length equivalent to said length of said foam block;
   a width "d" between the sides of the recess;
   a depth "c"; and
   a terminal, semi-circular arc part with a diameter of "d"; the dimensions "a", "b", "c", and "d" satisfying the equations:
   a is equal to (0.90 to 1.10)b;
   c is equal to (0.65 to 0.80)b; and
   d is equal to (0.45 to 0.55)a.

* * * * *